Figure 1:
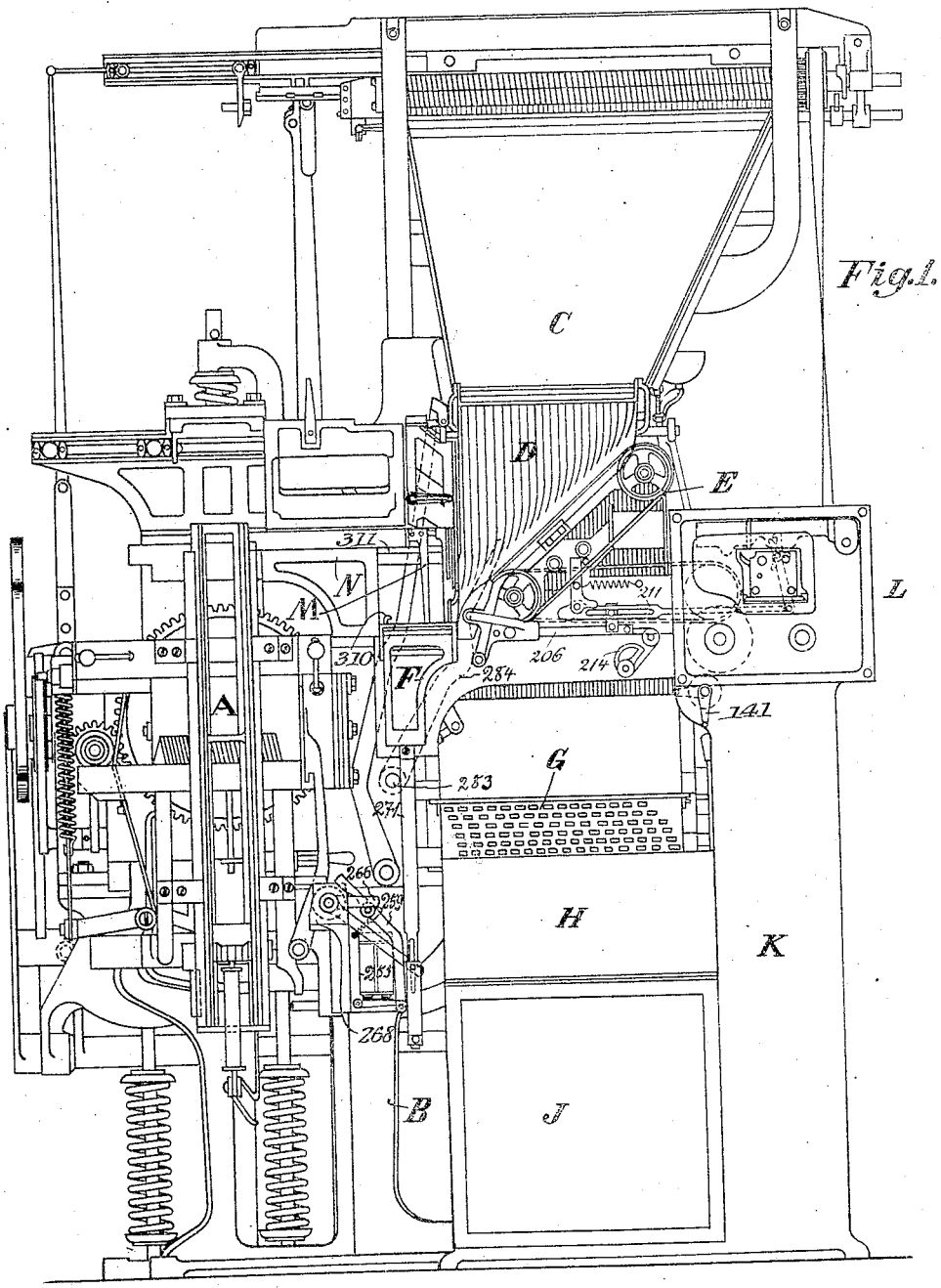

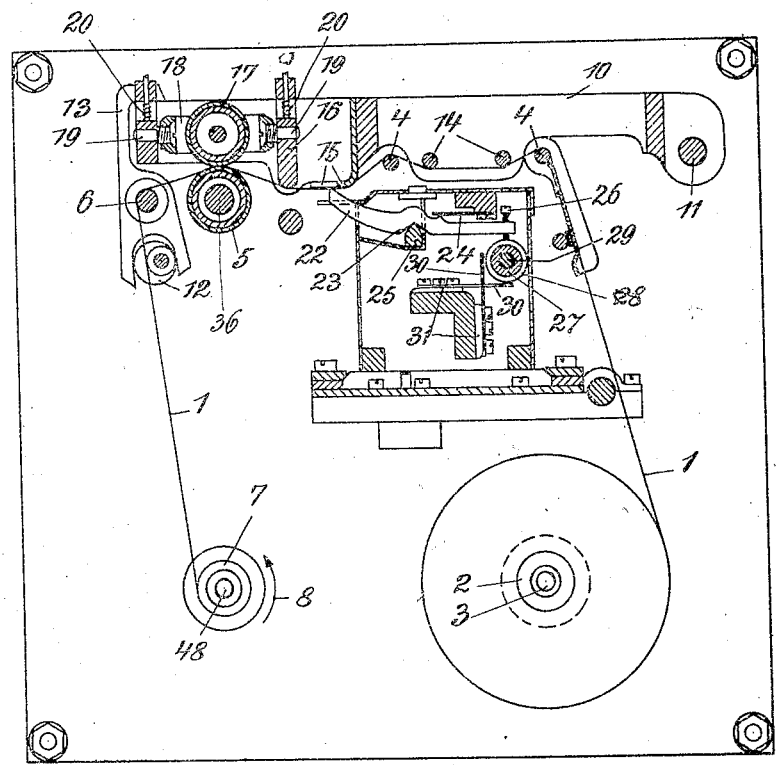

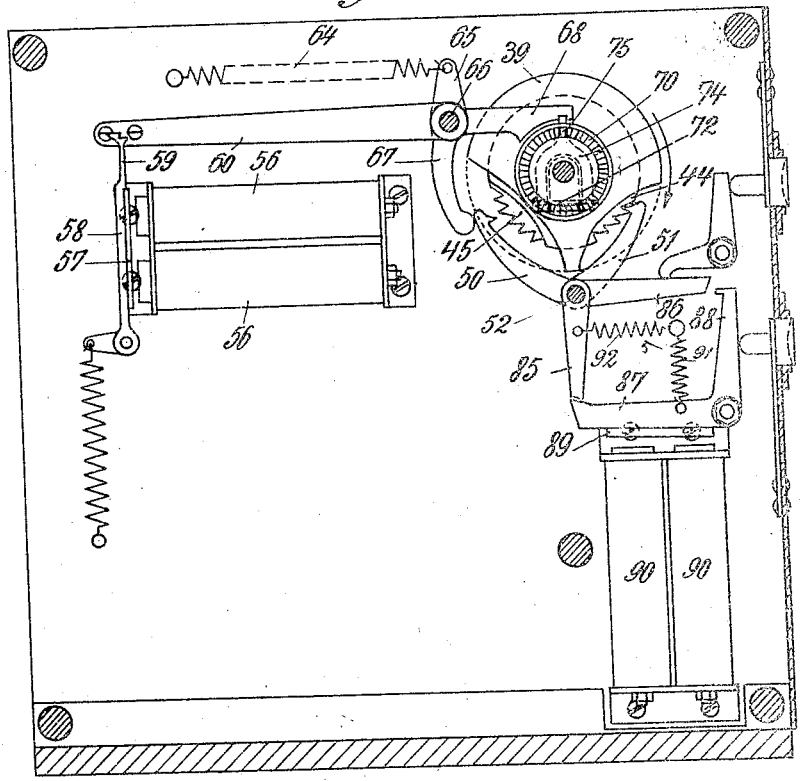
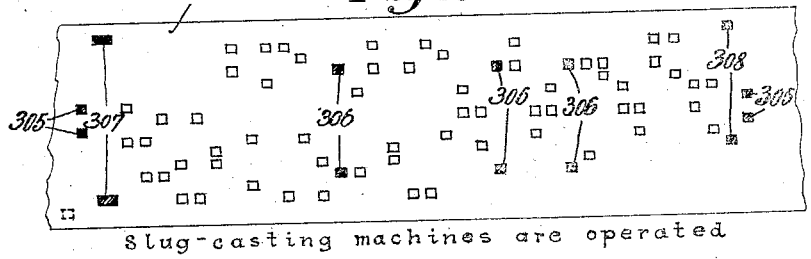

H. DREWELL.
AUTOMATIC LINE CASTING MACHINE.
APPLICATION FILED APR. 16, 1912.

1,163,984.

Patented Dec. 14, 1915.
10 SHEETS—SHEET 5.

WITNESSES:
John C. Sanders
Albert F. Neuman

INVENTOR:
Heinrich Drewell
BY
ATTY

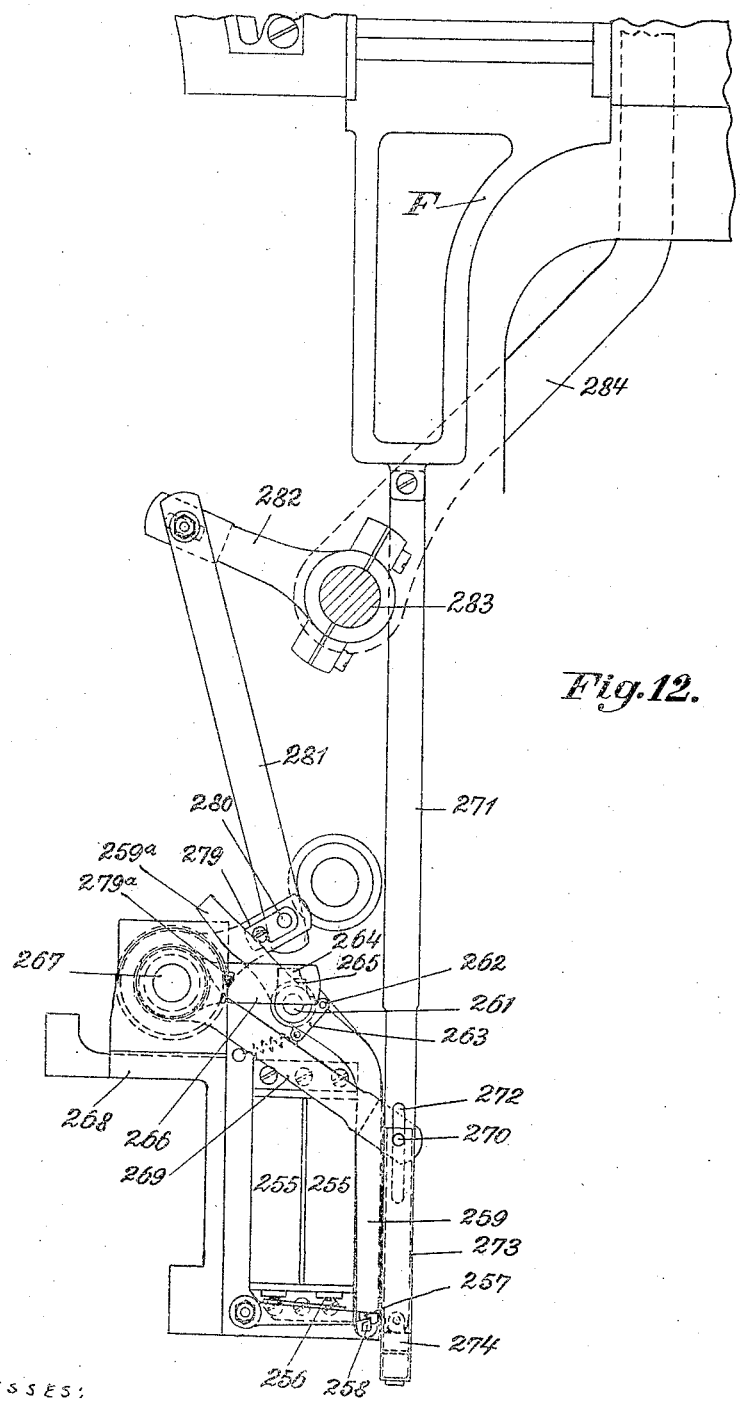

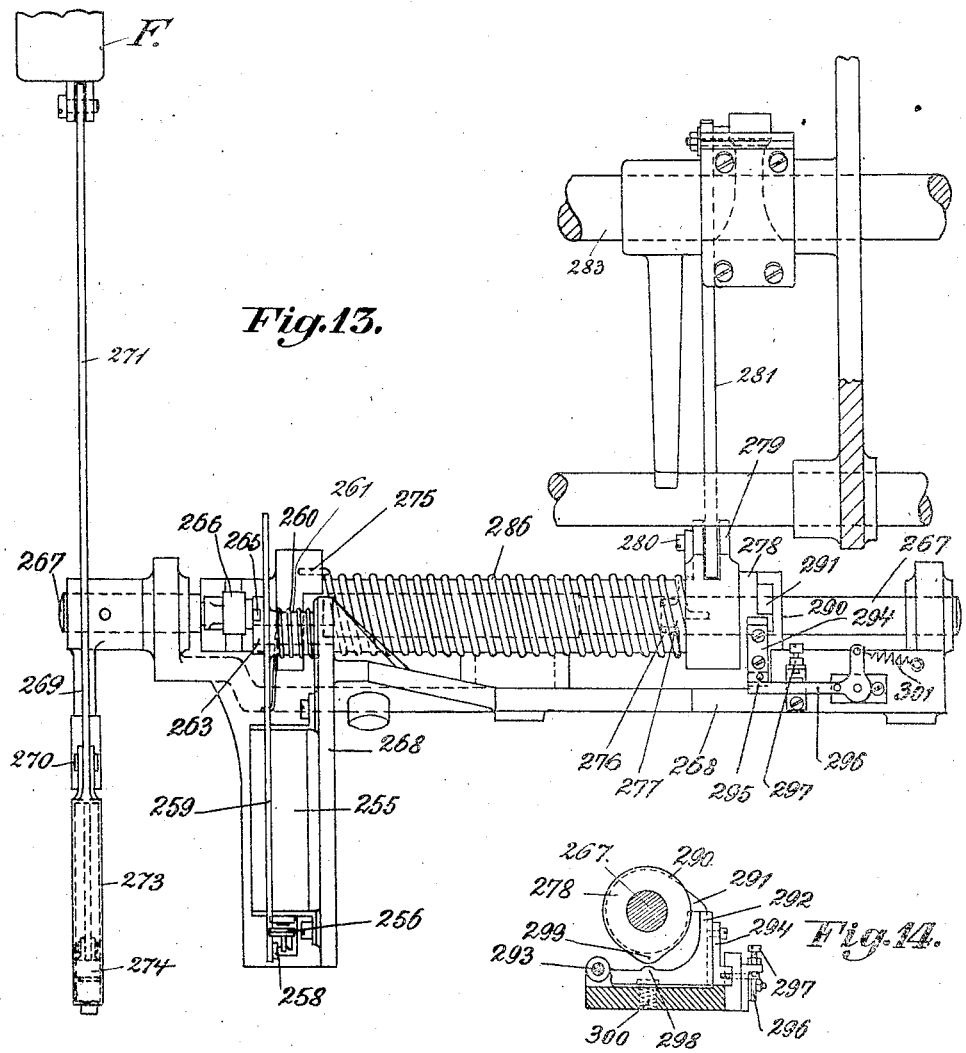

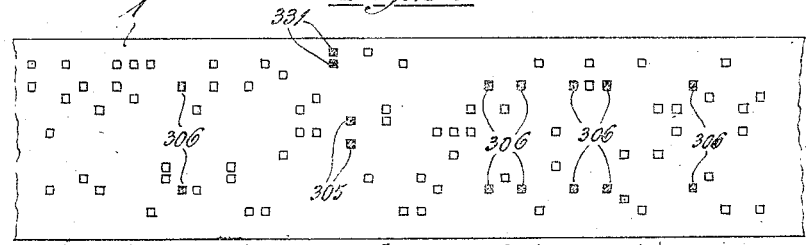

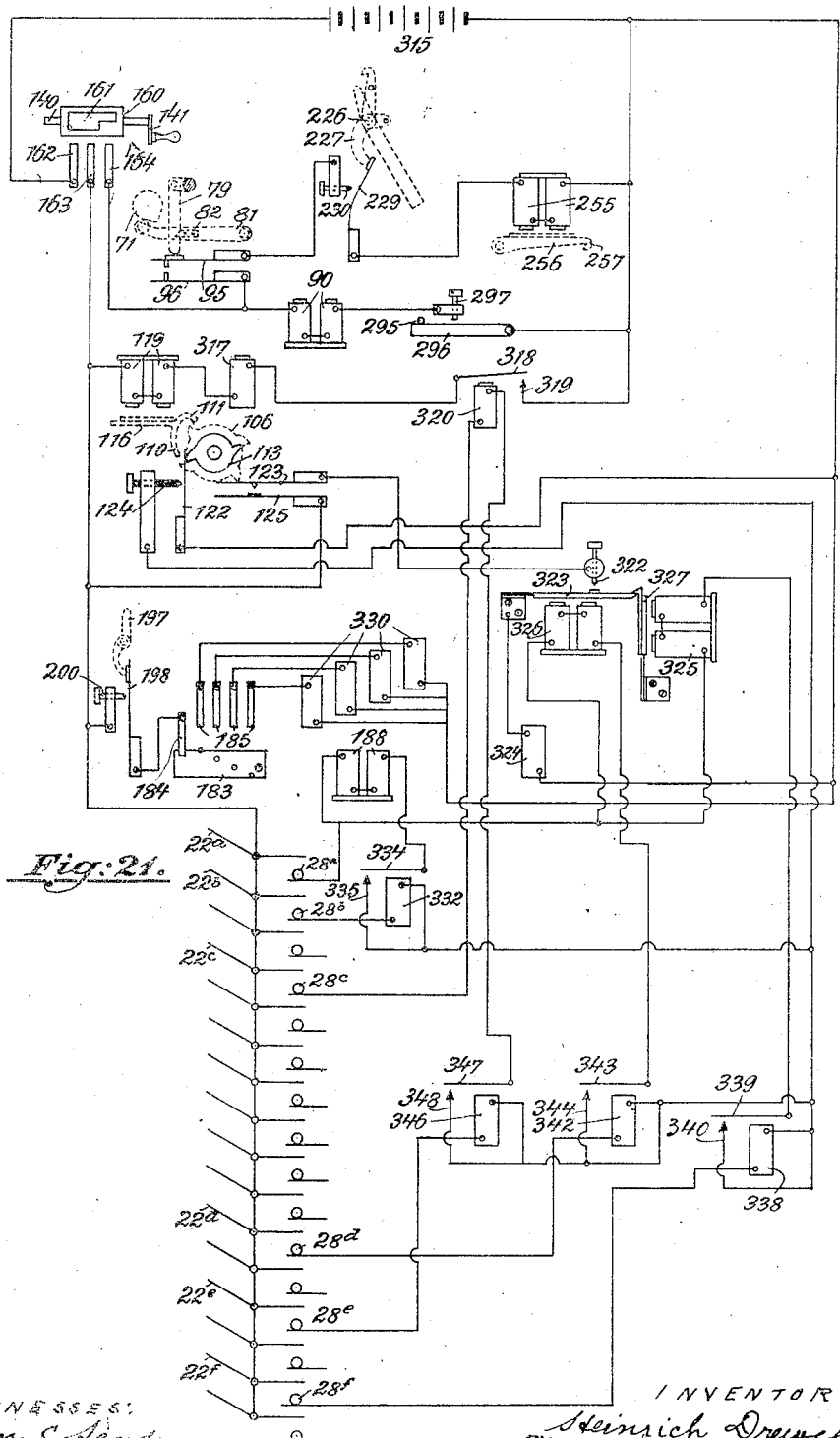

UNITED STATES PATENT OFFICE.

HEINRICH DREWELL, OF CHARLOTTENBURG, GERMANY, ASSIGNOR TO SCHNELLSETZ-MASCHINEN-GESELLSCHAFT MIT BESCHRANKTER HAFTUNG, OF CHARLOTTENBURG, GERMANY.

AUTOMATIC LINE-CASTING MACHINE.

1,163,984.  Specification of Letters Patent.  Patented Dec. 14, 1915.

Application filed April 16, 1912. Serial No. 691,100.

*To all whom it may concern:*

Be it known that I, HEINRICH DREWELL, a subject of the German Emperor, residing at Charlottenburg, Germany, have invented new and useful Improvements in Automatic Line-Casting Machines, of which the following is a specification.

My invention relates to automatic matrix-setting and line-casting machines operated by means of perforated bands. Its special object is to adapt matrix-setting and line-casting machines of the kind as described, for instance, in the U. S. A. patent specifications 436,531, 436,532 and 557,000, for operation with perforated bands, which can be produced by manipulating any ordinary typewriting machine combined with a perforating device. Hereby the casting device in the Mergenthaler machine and also the greater part of the setting apparatus is not altered, though devices for striking the keys with the aid of electromagnets are fitted underneath the key-levers, and these electromagnets are energized in correspondence to the perforations of the band. This part of the device has already been described in my U. S. A. Patents 864,519 and 915,748. The striking of the keys causes delivering of matrices, as described in the before mentioned specifications. The lines are justified by means of the well known wedge-shaped justifiers. In such lines however, in which the enlarging possibilities of these justifiers do not suffice, blank-matrices are employed and are inserted besides the wedge-shaped justifiers during the setting of the line. The method employed to obtain this by means of perforated bands, has also been described in detail in my U. S. A. Patent 954,023.

The proceeding of the band is stopped or delayed for a moment when one of the wedge-shaped justifiers is being set, on account of the greater length of the latter causing trouble in the regular falling and gathering of the—comparatively shorter and therefore quicker—matrices.

After the completion of a line the assembling elevator is raised by means of a spring, so that the line may be transferred to casting position. Between the setting of the last matrix of a line and the raising of the assembling elevator, however, a short pause is inserted automatically, which assures that the last matrix correctly finds its way into the assembling elevator before the latter rises.

A special device has been provided for setting lines which are only partially filled up with characters, and which often occurs, for instance, at the end of paragraphs. With this device it is possible to fill the empty space in such a line automatically with the necessary blank-matrices by employing only a single perforated symbol on the perforated band.

Figure 2:
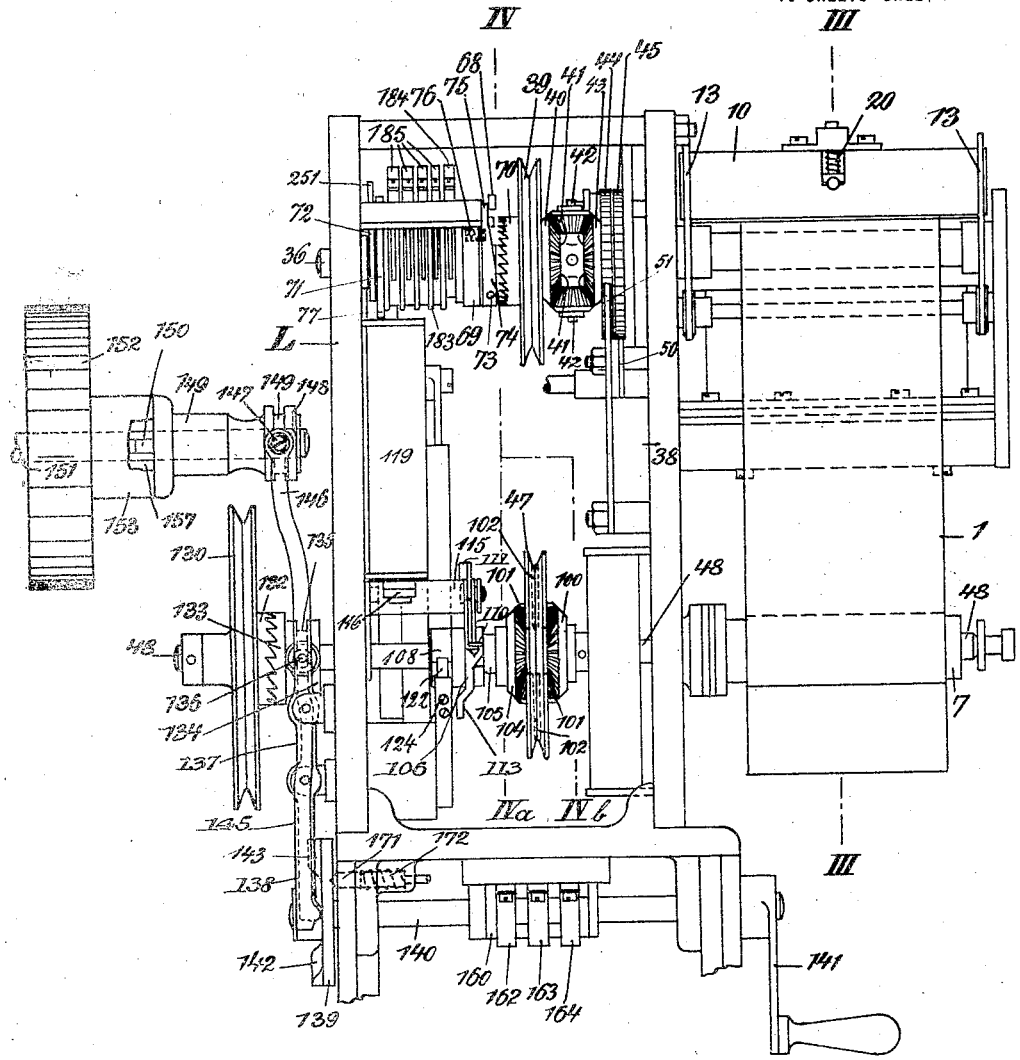
Figures 3, 4:
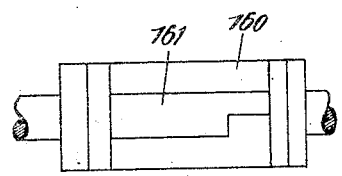
Figure 8:
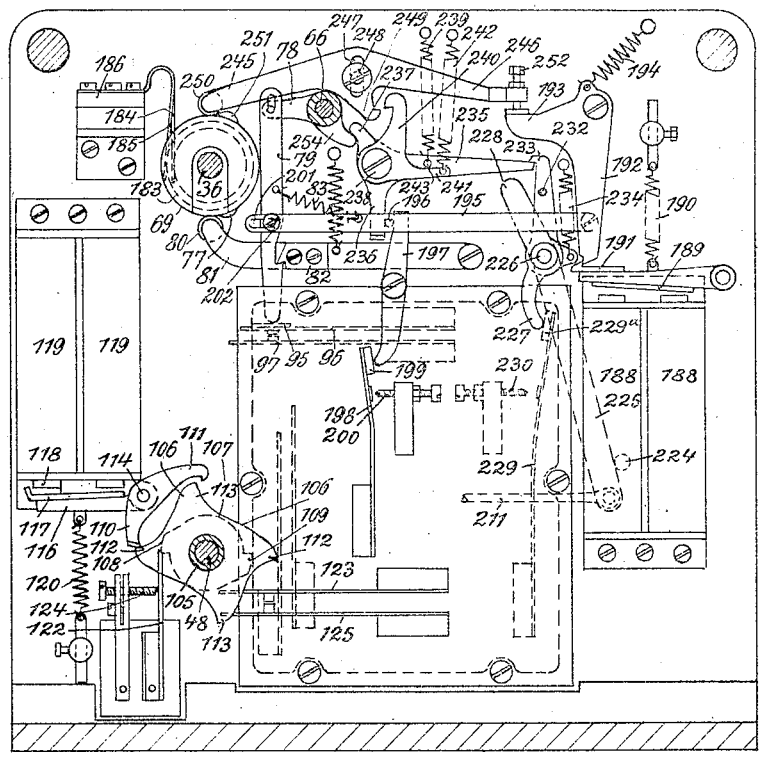
Figure 9:
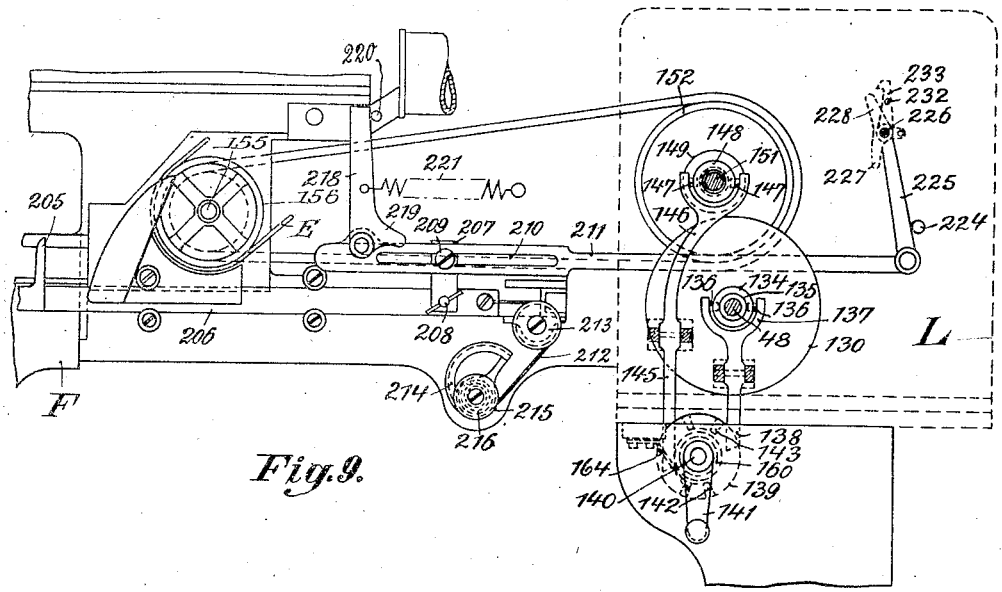
Figures 10, 11:
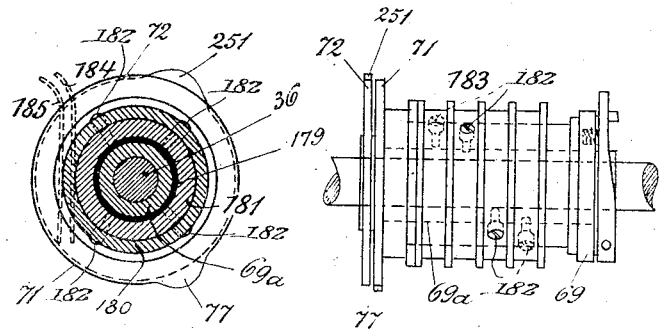

Figure 1 is a front view of the whole automatic machine. Fig. 2 is a side view of the device operated by the band and of the band-feeding mechanism. Figs. 3 and 4 show a contact roll employed in the apparatus shown in Fig. 2. Fig. 5 is a section through the front part of the apparatus shown in Fig. 2 at the line III—III. Fig. 6 shows the contact roll made of rings, which belongs to the apparatus illustrated in Fig. 5. Fig. 7 is also a section through Fig. 2 at the line IV—IV$^b$ in the upper part of the Fig. 2. Fig. 8 is a section on line IV—IV$^a$, seen from the other side. Fig. 9 shows the device for controlling the length of the lines, as well as the mechanism for stopping the machine. Figs. 10 and 11 show a contact roll out of the apparatus illustrated in Figs. 2 and 8. Fig. 12 shows a front view of the device for lifting the assembling elevator. Fig. 13 is a side view of the same device. Fig. 14 shows a contact-device which causes the band to proceed after a line of matrices has been passed on into the casting device. Fig. 15 shows a piece of perforated band of the kind used for the apparatus described hereafter. Figs. 16 and 17 show details of the mechanism shown in Figs. 2 and 8. Figs. 18 and 19 show details of the device shown in Figs. 12 and 13. Fig. 20 shows a portion of a perforated band containing a line-filling symbol. Fig. 21 shows a diagram of the electric connections between the electromagnet and contacts of the apparatus.

In Fig. 1 the Mergenthaler machine is to be seen with the casting apparatus A fitted in the main frame B of the machine together with the other parts of the machine. The magazine C contains the matrices. The latter pass, when released, through the channels D and by means of the transferring band E into the assembling elevator F. The key-board G forms the lower part of the matrix-setting device. The keys of this board had to be struck until now by the operator's hand. In order to employ my invention in connection with the Mergenthaler machine a box is fixed underneath the keyboard, the upper part H of which contains the electromagnets controlling the key-levers, while the lower part J contains the device, described in my U. S. A. patents mentioned before, with the aid of which the perforations of the band actuate the key-levers. A case K is mounted on the side of the box H J, and carries another case or frame L, which contains the band-feeding mechanism.

A perforated band of the kind used in the setting machine here described and shown in Fig. 15 allows sixteen different perforations being made in one row across the band. Each perforated symbol consists of a pair of perforations, and the sixteen possible perforations in one row enable 120 different pairs to be formed. These are used partly for controlling the character and blank-controlling keys of the key-board G, and partly for starting a variety of other operations necessary for a proper line of type to be brought about by means of the perforated band. If desired the number of perforations possible in one row can be increased in case of more than 120 various symbols being necessary.

Each group of perforations representing a complete line is limited by two line-separating symbols 305. The spaces between the words are given by the word-separating symbols 306. These symbols cause a wedge-shaped justifier to be dropped into the assembling elevator. If a line cannot be justified properly by employing these justifiers only, a justification-symbol 307 is provided in front of the pair of perforations representing the first character of the line. This symbol is produced in the manner described in my U. S. A. Patent 954,023 with the aid of an auxiliary symbol 308 at the end of the line. For the sake of clearness those symbols which do not represent characters are shaded in Fig. 15.

The perforated band 1, wound on an appropriate roll or spool, is put on to a cylinder 2, which rotates loosely on the shaft 3. The free end of the band 1 is then passed over the transverse rods 4, a feeding roll 5, a further transverse rod 6, and fastened to a spool 7. The latter is caused to rotate in the direction of the arrow 8 by means of a friction-clutch and winds up the band as required. After the band has been placed over the transverse rods 4, the roll 5, the rod 6, as described before, the frame 10, which is pivoted to the shaft 11, is shut down and locked in position by two pawls 13 actuated by the eccentric disks 12. The frame 10 contains several transverse rods 14 as well as a comb-like guide 15, under which the band runs. After passing a further transverse rib 16, the band 1 runs over the feed roll 5, against which is pressed the counter-roll 17. The latter is mounted in a frame 18 which is pivotally mounted on the journals 19. The journals 19 are forced downward by the springs 20 thus pressing the counter-roll 17 firmly against the feed roll 5. The frame 18 is rotatably mounted in order to keep the pressure of the counter-roll on the feeding-roll uniform for the entire width. The two rolls being covered with rubber or similar elastic material, the band will proceed in correspondence to the rotation of the rolls.

From underneath sixteen levers 22, corresponding with the sixteen longitudinal rows of holes in the band, are pressed against the comb 15 with one end by their springs 24, their saddles 23 resting on the fulcrum 25, while their other end carries a contact-screw 26, which tends to come in contact with the contact-roll 27 underneath. The contact roll 27 consists of sixteen single insulated rings 28, which are fitted on the shaft 29. Spring-contacts 30 fastened to a contact clamp 31, are sliding upon each ring. The clamps 31 with their springs 30 are fitted alternately vertical and horizontal, in order to procure the width necessary for the clamps and the electric wires. The wires are not shown in the drawings. The shaft 29 is rotated by suitable driving means (not shown in the drawings) in order to keep the surfaces of the springs 30 and the screws 26 and of the contact rings clean. The points of the levers 22 are situated opposite the spaces in the comb 15 and enter the latter when there is no paper intervening between the comb and the levers. Each time a perforation occurs between them the other end of the levers 22, i. e. the contact screw 26, comes in contact with the corresponding ring.

The shaft 36 of the band feeding roll 5 bears its driving mechanism at its other end on the other side of the intermediate wall 38 of the apparatus. The driving mechanism consists of a pulley 39 rotating loosely on the shaft 36, and being rigidly connected with a bevel wheel 40 which engages in two planetary wheels 41, the journals of which are rigidly connected with the shaft 36. The planetary wheels 41 engage in a further bevel wheel 43 which loosely rotates on the shaft 36 and is connected to a ratchet wheel 44. Next to this ratchet wheel 45 is rigidly mounted on the shaft 36.

The pulley 39 is continually driven by means of the pulley 47 on the shaft 48. Two pawls 50 and 51 engage in the ratchet wheels 44 and 45 (Fig. 7). Both pawls are rigidly connected one to another and to the shaft 52 in such position that, for a time, only one of them can engage in the wheels 44 or 45, so that the wheels 44 and 45 can be caught only alternately by the pawls 50 and 51, but not simultaneously. When the apparatus is at rest the pawl 50 engages in the wheel 45 and prevents the rotation of the same and of the shaft 36 with which it is connected. The journals 42 of the bevel wheels 41 then transmit the continuous rotation of the cord pulley 39 and the bevel wheel 40 to the bevel wheel 43 and the loose ratchet wheel 44, without moving the paper band. In order to start the movement of the band the action of the two pawls 50 and 51 must be changed so that the pawl 51 engages in the wheel 44 and the pawl 50 leaves the wheel 45. The wheel 44 and the bevel wheel 43 are now prevented from rotating and thus cause the planetary wheels 41 to rotate around their pinions 42 and with the latter around the shaft 36 and together with this shaft.

When setting is to be interrupted, for instance in order to deliver a completed line of matrices into the casting apparatus and before beginning a new line, the movement of the perforated band must be stopped. The following device (Fig. 7) is provided for this purpose: By means of a pair of perforations in the band forming the so-called line-separating symbol two levers 22, which close electric circuits, are actuated. The two respective currents select and energize the electromagnet 56, which attracts its armature 57. The lever 58 of this armature bears a double pawl 59, which supports the arm 60 of the lever 60, 65, 67, 68. The locking of the lever 60 by the pawl 59 is so arranged that its complete release can only be brought about by a to-and-fro movement, that is, by the armature 58 being attracted and released by the electromagnet 56. When the action of the electromagnet 56 ceases and the armature 58 is released, the arm 60 of the lever is pressed down by a spring 64 which engages the lever arm 65. The lever arm 65 and also the arm 60 are fixed on the spindle 66. The latter bears a further lever 67, which presses with its free end against the end of the pawl 50 when the lever 60 is moved downward, thus disengaging the pawl 51 and causing the spindle 36 to stop at once, as heretofore described.

In order to return the lever arms 60 and 67 to their original positions, a further lever arm 68 is provided on the spindle 66. Rigidly connected with the pulley 39 is a crown-wheel 70, forming a ratchet-wheel. Opposite to this a disk 69 is mounted rotatably on the shaft 36. To the disk 69 is pivoted a forked lever 74 and pin 73, which bears on its free end a clutching pawl 75 movable in the direction of the axis of the shaft 36. In its rest position the pawl 75 is supported by the end of the lever 68 and therefore cannot engage in the crown-wheel 70. When the lever arm 60 is released by the electromagnet 56, the lever arm 68 rocks with the lever arm 60 and the spindle 66, and releases the pawl 75. The latter then engages in the crown-wheel 70 under the action of the spring 76 and is thereby caused to revolve around the shaft 36.

Connected to the disk 69 is a sleeve 69ª (Figs. 10 and 11) which bears two cams 71 and 72. The cam 71 is provided with a projection 77 which when the cam 71 has nearly terminated a complete revolution, depresses an antifriction roll 80 on the end of the lever 81. On the latter is provided a dog or pawl 82 which engages in the recess of a rod 79. This rod is operatively connected to a lever arm 78 which is secured on the spindle 66. A spring 83 normally holds the rod 79 engaged by the dog 82. The depression of the lever 81 by the projection 77 rocks the lever arm 78 and returns therewith the spindle 66 with the lever arms 60, 65, 67 and 68 secured thereon. The lever arm 60 is then locked by the pawl 59 of the armature lever 58. Now the clutching pawl 75 engages the lever arm 68 and, by means of a suitably shaped sliding face on the end of this lever arm, is withdrawn from the crown-wheel 70, the disk 69 and the cams 71 and 72 being simultaneously made inoperative.

The pawls 50 and 51 are secured in their position making the band feed mechanism inoperative by the angle lever 87, 88 locking the lever arms 85, 86 which are rigidly connected to the pawls 50 and 51. The lever arm 87 bears the armature 89 of an electromagnet 90. When the pawls 50 and 51 arrive in the proper position for stopping the perforated band, the end of the lever 87 engages the arm 85 and thus holds the lever-system 50, 51, 85 and 86 in position. If the electromagnet 90 is now energized (which occurs when the line assembling elevator returns to its assembling position after transferring a line of matrices) the armature 89 is attracted and the lever arm 87 withdrawn from the lever 85. Simultaneously the lever arm 88 catches the lever arm 86 which is released when the electromagnet 90 allows the armature 89 to be retracted. This occurs in the moment, when the assembling elevator properly arrives in its assembling position, in which it causes the circuit of the electromagnet 90 to be interrupted. Now the levers 50, 51, 85 and 86 under the action of a spring 92 perfectly return to that position in which the ratchet wheel 45 is released, the wheel 44 locked, and the perforated band 1 actuated.

The bottom end of the rod 79 rests on an insulating plate 95, which is fastened on the end of a contact spring 96. The depression of the rod 79 by means of the projection 77 on the cam 71 and the lever 81 further causes a contact between the springs 95 and 96. This contact serves to energize an electromagnet, which controls the releasing of the assembling elevator which is then lifted from its assembling position to its line-transferring position, as hereafter described.

Since a certain time is required for the matrices delivered from the magazine to enter the assembling elevator, the elevation of the latter is somewhat delayed in the following manner: Owing to the rest-position of the cam 71 the contact between the springs 95 and 96 is not closed until the cam 71 has almost performed one complete revolution. During the time of this revolution the last matrices delivered from the magazine may properly enter the assembling elevator. Also the feeding of the perforated band is delayed in certain cases, for example when a wedge-shaped justifier or a matrix of an extraordinary form or size is to be delivered into the assembling-elevator. The delivery of such wedge-shaped justifier or matrix requires somewhat more time than the delivery of matrices of the common form and size and by delaying the feeding of the perforated band a short stop is inserted after the actuation of each perforated symbol which causes the delivery of a justifier or a matrix of an extraordinary form or size. When setting a wedge-shaped justifier it is sometimes necessary to introduce simultaneously into the line a blank matrix for enlarging the space between the words of the line in order to justify the line. For this purpose the device for delaying the feeding of the band is combined with means for causing a blank matrix to be delivered, if such delivery is necessary in the line which is being set up. But the actuation of these means depends upon the actuation of a special justification symbol placed on the band in front of all the character selecting symbols of a line, means being provided to be actuated by said justification symbol and when actuated making the means for causing the delivery of blank matrices operative, for these means are inoperative without the actuation of a justification symbol; after such an actuation the blank matrices are delivered throughout the line each time a wedge-shaped justifier is delivered. After the line has been filled when terminating the line, the blank delivery means are made inoperative.

For delaying the actuation of the perforated band in case of a wedge-shaped justifier being delivered the following device may be employed.

The pulley 47 which drives the pulley 39, rotates loosely on the shaft 48. A bevel-wheel 100 is fastened on this shaft and engages in planetary wheels 101 which rotate on pivots 102 mounted in the pulley 47 at right angles to the shaft 48. The planetary wheels 101 engage a further bevel-wheel 104. With this a ratchet-wheel 106 and a cam 107 (Fig. 8) are connected by means of a bush or sleeve 105 and can rotate loosely around the shaft 48. The cam 107 and its projections 108 and 109 are made of an electrically insulating material. Normally a pawl 110 engages the ratchet-wheel 106 and prevents it from being rotated. In consequence when the shaft 48 and the bevel-wheel 100 are driven, the planetary wheels 101 must not only rotate around their pivots 102 but also drive the pulley 47 around the shaft 48. This rotation is then transmitted to the pulley 39, shaft 36 and feed roll 5, which drives the perforated band 1. The pawls 110 and 111 form an angle lever, which rocks on the pivot 114 and by a sleeve 115 is connected to an armature lever 116 carrying the armature 117 of an electromagnet 118. The pawls 110 and 111 and the teeth 112 and 113 are axially displaced in such way that the pawl 110 only engages the teeth 112 and the pawl 111 only the teeth 113 of the ratchet-wheel 106 (Figs. 2 and 8). A spring 120 actuating on the armature lever 116, normally holds the pawl 110 in engagement with one of the teeth 112. As soon as the electromagnet 118 attracts its armature 117 the pawl 110 is disengaged from the ratchet-wheel 106 and the latter rotates loosely around the shaft 48 and in a direction opposite to that in which the shaft 48 revolves. But after a very short time the further rotation of the ratchet-wheel 106 is prevented by the pawl 111 engaging one of the teeth 113 of the ratchet-wheel 106. The projections 108 and 109 of the cam 107 act on two contact springs 122 and 123. During the rest position of the cam 107 one of its projections 108 or 109 presses the spring 122 against a contact screw 124. As soon as the cam 107 begins to rotate, the respective projection 108 or 109 leaves the spring 122 and the contact between the spring and the screw 124 is interrupted. This causes the electromagnet 118 to release its armature 117 and to allow the pawl 111 to be retracted from the tooth 113 of the ratchet wheel 106. Now a further rotation of the bevel wheel 104, the sleeve 105, the ratchet wheel 106, and the cam 107 takes place, which, however is limited after some time by one of the teeth 112 which abuts against the pawl 110. Owing to the feeding of the perforated band presenting a comparatively large resistance to the rotation of the pulley 47, and the friction of the sleeve 105 on the shaft 48 a comparatively small resistance to the rotation of the bevel wheel 104 and the ratchet-wheel 106, the planetary wheels 101 drive the bevel wheel 104 instead of the pulley 47 as soon as one of the pawls 110 and 111 release the ratchet wheel 106. The pulley 47 and in consequence the pulley 39, the shaft 36, the band feeding roll 5 and the perforated band 1 itself then remain stationary for a short time. The coils 119 of the electromagnet 118 are in series or in parallel with the coils of an electromagnet of the keyboard G controlling the delivering of the wedge-shaped justifiers. Both these electromagnets are energized when the word-separating symbol 306 of the perforated band actuates on the corresponding levers 22. When this occurs a wedge-shaped justifier is delivered the movement of the perforated band being simultaneously interrupted for a moment and its action delayed, thus leaving a sufficient time to the wedge-shaped justifier for being correctly introduced into the assembling elevator. As the wedge-shaped justifiers are considerably longer than the ordinary matrices its introduction into the assembling elevator would cause trouble when the machine operates with a high speed. This is dispensed with by the before described means for delaying the action of the perforated band in such cases.

If a justifying symbol 307 is placed on the perforated band in front of the first character selecting symbol of a line during the composition of this line besides each wedge-shaped justifier a blank matrix must be delivered into the assembling elevator. This is performed as follows: The ratchet-wheel 106 being provided with two teeth 112 and two teeth 113 each attraction of the armature 117 causes half a revolution of the bevel wheel 104, ratchet-wheel 106 and the cam 107. This half revolution consists of two steps which are separated from each other by a tooth 113 abutting against the pawl 111. During the first of these steps the contact spring 122 leaves the contact screw 124. During the second step one of the projections 108 or 109 on the cam 107 actuates on the contact spring 123 and presses it against the spring 125, thereby closing an electric circuit, which contains besides the springs 123 and 125 the coil of a key-operating electromagnet and a band-controlled switch. The latter is operated by two electromagnets one of which is energized when the justifying symbol actuates on corresponding levers 22 of the apparatus as hereafter described more particularly. The switch is then thrown into its operative position and remains therein during the assembling of the line, until the symbol 308 placed on the band behind the last character selecting symbol of the line becomes operative and throws the switch into its inoperative position. As long as the switch is in its operative position each contact between the springs 123 and 125 causes the key-controlling electromagnet the coil of which lies in the same circuit to become energized and to strike its key, which delivers a suitable blank matrix into the assembling elevator, thus completing the justification of the line in question. The shaft 48 is driven by means of a pulley 130, which is arranged behind the case L and rotates loosely on shaft 48. The pulley 130 may be driven by any continually rotating shaft of the matrix-setting apparatus.

In order to obtain uniformity between the feed of the perforated band and the operation of the key-board mechanism, I prefer to drive the pulley 130 with the aid of the shaft of one of well known rubber rolls which serve to actuate the matrix-releasing devices of the Mergenthaler line casting machine. With the pulley 130 there is connected a crown-wheel 132, opposite to this a second crown-wheel 133 is mounted on the shaft 48. The latter crown-wheel is not rotatable but axially displaceable on the shaft 48 and may be brought in and out of engagement with the former crown-wheel by means of a two-armed lever 137, 138 (Figs. 2 and 9) the forked end 137 of which carries two pins 136 and engages therewith in a circular groove 135 on the sleeve 134, which is connected to the crown wheel 133. The lever 137, 138 is pivoted on the rear side of the case L and its arm 138 rests against a cam 139 which is secured on a shaft 140 and carries two projections 142 and 143, the latter of which acts on the end of the lever arm 138. A suitable spring (which is not shown in the drawings) tends to bring the crown-wheel 133 in engagement with the crown-wheel 132 thereby pressing the lever arm 138 against the cam 139. The shaft 140 carries on its other end that is on the front-side of the case L a crank 141. The projection 142 acts on a lever 145, 146 whose forked end 146 carries pins 147. These pins engage in a groove 148 of a bush or sleeve 149, which forms a part of the well known coupling device controlling the driving of the transferring belt E of the Mergenthaler line casting machine. A pulley 152 is loosely mounted on the continually rotating shaft 151 and is provided with a hub 153 having a recess 157. Projections 150 of the sleeve 149 which partakes in the continuous rotation of the shaft 151 but is axially displaceable on the latter engage this recess thereby transmitting the rotation of the shaft 151 to the pulley 152. The latter drives a suitable pulley on the shaft 155 (Fig. 9) on which a pulley 156 is secured. The latter pulley drives the transferring belt E.

The shaft 140 of the handle 141 carries a contact roll 160 consisting of an electrically insulating material, in which a metal piece 161 (Figs. 2, 3 and 4) is dovetailed. Three springs or brushes 162, 163 and 164 slide on the roll 160 and are, in the operative position of the roll, electrically connected by the metal piece 161. The brushes 162 and 163 serve to control the operating electric-current of the whole machine, while the brush 164 which contacts with a smaller part of the metal piece 161 only controls that of the electromagnets one of which releases the spring for moving the assembling elevator while the other renders the band feeding device operative after it has been made inoperative for the purpose of transferring a line of matrices to casting position.

The projections 142 and 143 of the cam 139 and the metal piece 161 of the contact roll 160 are connected in such way that the main part of the apparatus one after another become operative. When the crank 141 is in its horizontal position (shown in dotted lines in Fig. 1) the band feeding device and transferring belt E are inoperative and the electric current is interrupted. If the crank 141 is turned about one twelfth of a revolution, the driving of the transferring belt E begins because the projection 142 of the cam 139 allows the lever 145, 146 to throw the sleeve 149 into gear with the hub 153 of the pulley 152. After turning the crank 141 about one twelfth revolution more, the projection 143 of the cam 139 allows the crown wheel 133 to engage in the crown wheel 132 by means of the lever 137, 138 while at the same moment the brushes 162 and 163 are electrically connected by the metal piece 161, and the operating electric circuit of the apparatus is closed. When at last the crank 141 is turned to the vertical position (shown in full lines in Figs. 1 and 9) the electromagnets which control the movement of the perforated band and the starting of the feed mechanism after a line has been transferred, are put in condition for being operative. On the contrary, when the crank 141 is turned out of its vertical position, at first those electromagnets are made inoperative, then the main circuit of the apparatus is interrupted and at last the transferring belt E is stopped. If, while the perforated band is operating the keys of the keyboard, the crank 141 is turned about one twelfth of a revolution out of its vertical position, the circuit of the electromagnets 90 and 255 which control the movement of the perforated band 1 and the assembling elevator F is interrupted by the brush 164 leaving the contact piece 161. Thus the operation of the band is caused to stop as soon as the line which is being set, has been completely assembled in the assembling elevator. If, however, the crank 141 is turned about two twelfths of one revolution out of its vertical position the projection 143 of the cam 139 actuates the lever 137, 138 thereby disengaging the crown wheel 133 from the crown wheel 132 and stopping the operation of the perforated band immediately. If the crank 141 is turned perfectly to its horizontal position the movement of the transferring belt E is stopped too, because the projection 142 then actuates the lever 145, 146 in such a way that the projections 150 of the sleeve 149 are disengaged from the hub 153 of the pulley 152.

To control the driving of the transferring belt E by means of a special step of the crank 141 gives the advantage that an operator, who operates the matrix-setting device directly by means of the keyboard G without employing the perforated band, may stop and start the movement of the belt E without interfering with the operation of the band feeding device. A pin 171 (Fig. 2) actuated by a spring 172 engages in suitably arranged recesses of the cam disk 139 thus preventing an accidental movement of the cam 139 and the contact roll 160.

Lines, which are not completely filled with characters but have an empty space at its end as for example the last lines of paragraphs, must be filled with blank matrices when being composed. To do this automatically the following mechanism is employed: With the disk 69 which carries the coupling pawl 75 there is connected a sleeve or bush 69$^a$ (Figs. 10 and 11) to which a contact roll 183 and two cams 71 and 72 are secured and rotate therewith loosely on the shaft 36. Five brushes 184 and 185 contact with the roll 183. They are provided with binding screws 186 to which the wire connections of an electric circuit are fastened. The contact roll 183 consists of a bush or sleeve 179 made of an electrically insulating material and secured on the sleeve 69$^a$. The sleeve 179 is surrounded by a metal cylinder and a further insulating sleeve 180. Projections 182 pass through the latter and are secured in the metal cylinder 181. When the contact roll 183 revolves each of these projections contacts with one of the brushes 185, the brush 184 being in continuous contact with the metal cylinder 181. During the rest position of the contact roll 183 the brushes 185 lie against the insulating sleeve 180 without having any electric connection with the metal cylinder 181. The brush 184 is further electrically connected to a contact spring 198 (Fig. 8) which is operated in the following manner: When the empty space at the end of a line is to be filled up with blank matrices, the perforated band carries behind the group of holes representing such line a special symbol which may be termed the line-filling symbol. If this symbol actuates the corresponding levers 22, an electromagnet 188 (Fig. 8) is energized and attracts its armature 189 against the tension of a spring 190. With the armature 189 there is connected a retaining pawl 191, which normally holds an angle lever 192, 193 in its inoperative position. As soon as the pawl 191 is withdrawn from the lever arm 192, a spring 194 rocks the angle lever 192, 193 and the rod 195 connected therewith. The rod 195 carries a stop-pin 196 against which the upper arm of a two-armed lever 197 is pressed by the spring 198. An insulating piece 199 electrically insulates the lever 197 from the spring 198. Opposite to the latter a contact screw 200 is arranged. This screw may be electrically connected to the source of electric current, provided for operating the machine. When the rod 195 is rocked to the left (Fig. 8) the spring 198 comes in contact with the screw 200 and an electric connection between the source of electric current and the metal cylinder 181 is thereby completed. Each of the brushes 185 is connected to an electromagnet, which operates when energized a key of the keyboard G thereby causing a blank matrix to be delivered into the assembling elevator F. Behind the group of holes representing a line that wants to be filled up with blank matrices, and besides the line filling symbol, the normal line separating symbol 305 (Fig. 15) is perforated. Now when this symbol acts on the apparatus after a line filling symbol has been operative, the disk 69 is, as described before, clutched to the pulley 39 and is caused to rotate together with the contact roll 183. The brushes 185 one after another then come into contact with the projections 182. The before mentioned blank-key controlling electromagnets are then energized. In such case the roll 183 and the disk 69 must revolve as long as the line in question is not properly filled up. To this end the rod 195 carries on its one end a slot 201, in which a neck screw 202 engages. The latter is secured on rod 79 and when the rod 195 is rocked to the left (Fig. 8) the rod 79 is thrown out of gear with the pawl 82 on the lever 81. Now when the cam 71 is rotated together with the disk 69 its projection 77 will rock the lever 81 only but not the rod 79 and therefore not disengage the clutching pawl 75 from the crown-wheel 70.

After the line has been filled up with blanks the spring 198 must be withdrawn from the contact screw 200 and the movement of the contact roll 183 must be stopped. For this purpose the slide 206 (Figs. 1 and 9) which carries the so-called line resistant 205 is provided with a stop 207 which by a clamping screw 208 can be secured on the slide 206 according to the length of the lines to be composed. To the slide 206 there is attached a cord 212, which is guided by a roller 213 to a cam 214. A spiral spring 216 within a case 215 tends to rotate the cam 214 and to wind the cord 212 on the cam 214. The latter is so shaped that the tension of the spring 216 which acts on the slide 206 is somewhat diminished when the slide 206 advances. As the resistance caused by the friction of the already assembled matrices increases according to the increase of length of the line the whole resistance against the advancing of the matrices in the assembling elevator remains nearly unaltered during the composition of a line. On the upper end of the stop 207 is attached a neck screw 209, which slides in slot 210 on the one end of a draw-rod 211. The other end of this draw-rod is operatively connected to a lever 225 on the rear side of the case L. An angle lever 218, 219 is pivoted on the left end (Fig. 9) of the draw-rod 211 and lies in its rest position with its vertical arm 218 on a stop pin 220 secured in the main frame of the line casting machine. A spring 221 tends to move the lever 218, 219 and the draw-rod 211 to the right (Fig. 9) until the lever 225 abuts against a stop 224 arranged on the rear side of the case L. During the composition of a line the slide 206 is moved to the left and when the line is nearly completed takes with it the draw-rod 211. Owing to the tension of the spring 221 the upper end of the lever arm 218 rests on the stop 220 whereby the angle lever 218, 219 turns around its pivot until the lever arm 219 abuts against the head of the neck-screw 209. During the further movement of the draw-rod 211 the lever arm 218 leaves the stop 220 and the neck screw 209 is clamped between the arm 219 and the bottom of the slot 210. Thus the draw-rod 211 is so fixed to the slide 206 that stepwise movement of the latter does not advance the rod 211 more than the slide 206.

The lever 225, to which the rod 211 is operatively connected, is secured on an axle 226, which passes through the rear wall of the case L and carries on the inside a two-armed lever 227, 228 and a pawl 233. (Figs. 8 and 9). The latter is loosely rotatable on the axle 226 while the lever 225 and the two-armed lever 227, 228 are firmly connected to the axle. The lever arm 227 acts on a contact spring 229 from which it is electrically insulated by an insulating piece 229ᵃ. The contact between the spring 229 and the contact-screw 230 controls the movement of the assembling elevator F in such way that the latter cannot be lifted to the line transferring position as long as the spring 229 does not contact with the screw 230. As the contact spring 229 is controlled by the length of the line by means of the slide 206, draw-rod 211, levers 225 and 227, it is seen that a line of matrices, which has not a certain minimum of length cannot be transferred by the assembling elevator. This necessary minimum length is adjustable by the stop 207 on the slide 206 and by the contact screw 230.

If a line, which is to be filled up with blank matrices has reached its full length, the lever arm 228 abuts against a pin 232 attached to the pawl 233, thereby rocking this pawl against the tension of a spring 234 and withdrawing it from the lever arm 235 of the three-armed lever 235, 236 237. A spring 239 then rotates this lever whereby the lower end of the arm 236 engages the lever 197 and withdraws the contact spring 198 off from the contact screw 200. The electric current, which operates the blank delivering keys is here interrupted and the delivering of blank matrices ceases. Besides the three-armed lever 235, 236, 237 an angle lever 240, 241 is rotatable around the neck-screw 238 and is by a spring 242 pressed against a stop pin 243 on the arm 235. This angle lever 240, 241 and the two-armed lever 245, 246 in this case serve to stop the movement of the contact roll 183 and to cause the assembling elevator to be lifted.

The lever 245, 246 bears an antifriction roll 250 on its left end and an adjusting screw 252 on the right end (Fig. 8). The roll 250 rests on the cam 72 and the screw 252 on the arm 193 of the angle lever 192, 193. A neck-screw 248 guides the lever 245, 246 by means of a slot 247. The lever, which is also provided with a hook 249 adapted to engage with the pawl 240, can be rocked by the projection 251 of the cam 72. As long as the pawl 240 does not engage with the hook 249, the lever 245, 246 when lifted on its left end by the projection 251 turns around the supporting point of the adjusting screw 252 without depressing the lever arm 192. But when the hook 240 engages the hook 249 which occurs when the pawl 233 releases the three-armed lever 235, 236, 237, the rising of the roll 250 on the lever 245, 246 causes a depression of the adjusting screw 252 and the lever arm 193 brings the arm 192 behind the pawl 191, which again locks the angle lever 192, 193 in its inoperative position. Also the rod 195 is brought to its inoperative position thereby allowing the spring 83 to engage the dog 82 into the recess of the rod 79. During the following revolution of the disk 69 and cams 71 and 72 the projection 77 of the former cam depresses the lever 81 and simultaneously the rod 79. This restores the lever 78, the shaft 66, and lever 68 to their rest position, whereby the latter brings the clutching pawl 75 out of engagement with the crown wheel 70 and thus stops the movement of disk 69 contact roll 183, and cams 71 and 72. The depression of the rod 79 also causes the spring 96 to contact with the spring 95 in order to release the assembling elevator and to allow the assembled line of matrices to be transferred to casting position.

To lift the assembling elevator from its assembling position to its line transferring position the device shown in detail in Figs. 12, 13 and 14, is employed: On the main frame B of the machine and below the assembling elevator a bearing frame 268 (Fig. 12) is secured in a suitable manner. Mounted thereon is an electromagnet 255 and an armature lever 256, which carries a pawl 257. The pawl engages with a nose 258 on the two-armed lever 259, 259ª, which is pivoted at 261 and stands under the action of a torsion-spring 260 (Fig. 13), by which the lever is rotated counter-clockwise (Fig. 12) as soon as the pawl 257 releases the nose 258. This rotation is transmitted to a two-armed lever 263 by means of a stop pin 262 abutting against the lever arm 259. The lever 263 is provided with hook or pawl 264, which engages a nose 265 on the lever 266. The latter is rigidly secured on a shaft 267 which is rotatably mounted in the bearing frame 268. On the same shaft is attached a further lever 269 in the forked end of which a rod 271 is guided by a pin 270 which passes through a slot 272 of said rod and is secured in the forked end of the lever 269. The upper end of the latter is pivotally attached to the assembling elevator F. The pin 270 carries a cylinder 273 in which a piston 274 pivoted to the bottom end of the rod 271 slides. The cylinder 273 and the piston 274 form an air-brake, which takes up the shock of the assembling elevator F when the latter drops down to its lower position. If the lever arm 269 swings upward the assembling elevator F is lifted by means of the rod 271; the lower end of the latter swinging to the right in Fig. 12 and following the curved way of the lever arm 269.

With the lever arm 266 there is connected the one end of a sleeve or bush 275 which on its other end is provided with a recess 276. In this engages a projection 277 of the hub 278 of a lever 279 to which the bottom end of a rod 281 is pivoted by a pin 280. The top end of this rod is operatively connected to the end of a lever 282 which is rigidly fastened on the shaft 283 (Figs. 1, 12, 13). The latter is the so-called line-transferring shaft of the Mergenthaler linecasting machine which serves to operate the line transferring carriage M by means of the lever 284. How these latter parts are operated is well known from the before mentioned patent specifications and needs not to be described here.

Around the sleeve 275 a torsion-spring 286 (Fig. 13) is wound which engages on the one end a suitable hole or recess of the sleeve 275 and on the other a similar hole or recess of the hub 278 of the lever 279. In its rest position this spring is wound up and tends to rotate the sleeve 275 and the shaft 267. This rotation takes place when the electromagnet 255 attracts its armature lever 256 whereby the lever arm 259 and in consequence the lever arm 266 are released. The assembling elevator is then lifted by means of the lever 269 and rod 271 to its line-transferring position. Simultaneously the lever 259 is returned by the arm 259ª co-acting with a pin 279ª on the lever 266 which throws the lever 259, 259ª back to its rest position in which it is locked again by the pawl 257.

When the assembling elevator F arrives in its upper or line-transferring position the line of matrices is transferred into the casting elevator A by means of the line-transferring carriage M. The shaft 283 is then rotated for this purpose by means of a suitable spring which is not shown on the drawings and depresses by means of the lever 282 the rod 281, thereby transmitting its rotation in an opposite direction to the lever arm 279 and its hub 278 and further by means of the projection 277 to the sleeve 275 and the shaft 267. The coöperation of the assembler-lifting spring 286 and the means for winding it up depends upon the projection 277 and its position within the recess 276. In the rest position of the machine, i. e. when the assembling elevator F is in its lower position and the line transferring carriage M in the position shown in Fig. 1, the face 277ª of the projection 277 lies close to the face 276ª of the recess 276. Now if the assembling elevator F is lifted to its upper position, the sleeve 275 is turned in the direction of the arrow 275ª (Fig. 18) and as the hub 278 remains at rest the face 276ᵇ of the recess 276 is placed close to the face 277ᵇ of the projection 277. If, in this position, the line-transferring carriage M begins to move and the shaft 283 together with the hub 278 are rotated, the sleeve 275, the shaft 267 and both ends of the spring 286 are compelled to partake in this rotation, the tension of the spring 286 remaining unaltered. At the end of this rotation the shaft 267 and the sleeve 275 are locked in their positions by the pawl 264 catching the nose 265. Now if the line-transferring carriage is restored to its rest position by means of the well known cam on the main cam shaft of the Mergenthaler line-casting machine the hub 278 is rotated in the direction opposite to that of the arrow 278ª in Fig. 19 without transmitting this rotation to the sleeve 275 there being sufficient space between the faces 276ª and 277ª. As only one end of the spring 286 partakes in this latter rotation the tension of the spring 286 is thereby restored to the amount necessary for lifting the assembling elevator F.

During the first part of the first rotation of the shaft 283 and the movement of the line-transferring carriage toward the casting elevator A the assembling elevator F is in a well known manner held in its upper position by a catch 310 (Fig. 1) which is pivotally connected to the rear side of the assembling elevator and when the latter arrives in its upper position engages into a suitable recess of a rail 311. When the line of matrices has completely entered the intermediate guide N, the line transferring carriage M disengages the pawl 310 from the rail 311 and the assembling elevator F drops down into its lower or assembling position by its own weight. As the pin 270 slides in the slot 272 the downward movement of the lever arm 269, which begins together with the movement of the line-transferring carriage M, is not prevented by the assembling elevator remaining stationary for the time necessary for transferring the line of matrices from the assembling elevator F into the guide N.

On the shaft 267 and beside the hub 278 there is rigidly secured a small disk 290 provided with a nose 291, which normally depresses a lever 292 which is pivoted at 293 against the tension of a spring 300. A pin or finger 295 secured to the lever 292 by means of an intermediate piece 294 made of electrically insulating material normally holds a contact lever 296 against the action of a spring 301 out of contact with a contact screw 297. The lever 292 has projection 298 opposite to which a projection 299 is provided on the hub 278 of the lever 279. The contact lever 296 controls the energization of the electromagnet 90 (Fig. 7) which serves for rendering the band feeding device operative when the composition of a new line is to be commenced. When the assembling elevator F leaves its rest position and the shaft 267 is rotated, the nose 291 allows the lever 292 to move until its projection 298 abuts against the projection 299 of the hub 278. Now when the line-transferring carriage M is released and shaft 283, lever 282, 279 and hub 278 begin to rotate the projection 299 is displaced and allows a further movement of the lever 292 whereby the lever 296 comes into contact with the contact screw 297 and the electromagnet 90 (Fig. 7) becomes energized. When the assembling elevator returns to its assembling position, the levers 292 and 296 are again depressed by the nose 291 and the current of the electromagnet 90 is interrupted. This restores as described before the feed mechanism of the perforated band to its operative position and the automatic matrix-setting goes on.

Fig. 21 shows diagrammatically the electric connections between the contacts and electromagnets controlling the above described device. From a suitable source of current 315, a conductor leads to the brush 162, connected, in the operative position of the handle 141, to the brushes 163 and 164 by means of the metal piece 161. The brush 164 belongs to two different circuits likewise, one of which contains the springs 95 and 96, the screw 230, the spring 229 and the electromagnet 255, the latter actuating the pawl 257 and so causing the assembling elevator F to be lifted. The other circuit contains the brush 184, the electromagnet 90, the screw 297 and the lever 296. The electromagnet 90 serves, as described before, for re-accounting the perforated band after the assembling elevator F has delivered a line of matrices into the line carriage 31 and has returned into its rest position. From the brush 163 there are derived several circuits. One of these contains the electromagnets 119 and 317 and a contact formed by the armature lever 318 and the diagrammatically indicated screw 319. The electromagnet 119 actuates the before described devices for occasionally interrupting the operation of the register band and for inserting a blank matrix after a space-band justifier. The electromagnet 317 depresses the space-band key, and the contact 318, 319 energizes the electromagnets 119 and 317 when the perforated symbol representing the space-band justifier acts upon the levers 22. In this case the armature 318 is attracted by an electromagnet 320; it touches the screw 319 and closes the circuit. Part of another circuit is formed by the springs 125 and 123, the screw 322, the armature 323 and the electromagnet 324. The screw 322 and the armature 323 are also forming part of the above mentioned auxiliary switch, which is controlled by the perforated symbol 307 (Fig. 15) serving for justifying. The auxiliary switch comprises two electromagnets 325 and 326. The latter actuates the armature lever 325, the former the armature lever 327, the end of which forms a pawl engaging with the lever 323 and preventing it from touching the screw 322 as long as the switch stays in its "off-position." A pair of levers 22 being actuated the electromagnet 325 is energized, attracts the armature 327 and releases the lever 323. The latter is thrown against the screw 322 the switch being now in its "on-position" and closes the circuit of the electromagnet. Consequently the latter is energized each time the springs 123 and 125 contact, and depresses one of the keys of the composing machine. Another circuit contains the screw 200, the spring 198, the brush 184 and the contact roll 183 and branching there leads over the contact springs 185 to a number of electromagnets 330 and from there back to the source of current. The device contained in this circuit serves for automatically filling the empty space in lines, which are only partially filled with characters, and for controlling the electromagnet 330, that is for operating the matrix releasing means of a certain number of channels containing blank matrices. The actuation of this device depends upon the closure of the contact 200, 198 and the simultaneous rotation of the contact roller 183. If this occurs the electromagnets 330 are energized alternately and each of them depresses a key and thereby causes a blank matrix to be delivered into the elevator F. A further connection leads from the brush 163 to all the different levers 22. These levers are shown diagrammatically in Fig. 21, the levers concerned with the controlling of the actually described device being marked by special reference numerals. The perforated symbols corresponding with these levers are shown in Figs. 15 and 20, the latter figure showing a piece of a register band containing the end of one of the above mentioned partially filled lines and the beginning of the next line. The line separating symbol 305 is shown between the two lines and, at the end of the partially filled line, the line filling symbol 331, the holes of which coöperate with the two levers $22^a$ and $22^b$ (Fig. 21). When operated these levers touch the contact rings $28^a$ and $28^b$. In consequence the end of the electromagnet 188 (Figs. 21 and 8) is connected to one pole of the source of current and caused to attract its armature. The latter touches a contact screw 385 and so connects the end of the electromagnet 188 to the other pole of the source of current. The circuit of the electromagnet is closed and the latter is energized. In consequence the spring contact 198 touches the screw 200 and immediately the line separating symbol 305 acts upon the electromagnets 188 and 56 (Fig. 7) similar to the symbol 331. As a result of the acting of the line separating symbol 305 the movement of the register band is interrupted and the roll 183 begins to rotate causing the electromagnets 330 to be energized alternately and therefore to deliver blank matrices into the line till the contact 198, 200 is opened by means of the slide 206 in the already described manner.

The perforated symbol 307 (Fig. 15) acts upon the two levers $22^c$ and $22^d$. The latter closes, when touching its ring $28^c$, the circuit of an electromagnet 338, the armature 339 of which connects the electromagnet 325 of the already mentioned electromagnetical switch to one pole of the source of current by touching the screw 340. To the other pole of the source of current this electromagnet is simultaneously connected by means of the contact ring $28^c$ and the lever $22^c$; it is energized and causes the pawl of the armature lever 327 to release the end of the armature lever 323. The resulting contact of the lever 323 with the screw 322 brings about the above described operation. The perforated symbol 308 at the end of the line (Fig. 15) causes in a similar way the electromagnet 326 to be energized, the lever $22^d$ acted upon by this symbol causing, by touching the ring $28^d$, the electromagnet 342 to be energized, the armature 343 of which electromagnet connects the electromagnet 326 to one pole of the source of current by touching the contact screw 344. To the other pole this electromagnet is also connected by the simultaneously actuated lever 22ª and its ring 28ª.

The circuit containing the electromagnets 119 and 317 is closed by the perforated symbol 306 (Figs. 15 and 20) in the following manner: One (22ᵉ) of the two levers actuated by this symbol is connected to the electromagnet 320 (Fig. 21) by its ring 28ᵉ, the other one (22ᶜ) closing the circuit of an electromagnet 346 by touching its ring 28ᶜ, the armature 347 of this electromagnet in consequence touching the screw 348 and connecting the electromagnet 320 to the other pole of the source of current. The electromagnet 320 then attracts its armature 318 and so closes the circuit of the corresponding electromagnets 119 and 317. If a symbol 307 had been perforated at the beginning of a line, it acts upon the electromagnetical switch and causes the armature lever 323 and the screw 322 to contact. During the following setting of the line each symbol 306 causes the electromagnet 324 to be energized by means of the contact-springs 123 and 125 and so causes a blank matrix to be inserted beside the wedge-shaped justifier which is delivered by means of the electromagnet 317. At the end of such a line there will always be the perforated symbol 308, which by energizing the electromagnet 326 causes the lever 323 to be withdrawn from the contact screw 322 and to be caught by the pawl of the armature 327. In consequence the contact remains open.

The here described connections shown in Fig. 21 are not forming part of my present invention.

In the foregoing specification I have described my invention in connection with the Mergenthaler matrix-setting and line-casting machine only but instead of this machine any other machine of similar construction may be provided with the apparatus described before without departing from the nature and scope of my invention.

What I claim as my invention and desire to secure by Letters Patent is:

1. The combination of a matrix-setting and line-casting machine having an assembling elevator and adapted to be operated by perforated bands, containing line-separating symbols, feed means for feeding said bands, feed controlling means adapted to be operated by said line-separating symbols and when operated rendering said feed means inoperative, a spring-actuated lifting device for lifting said assembling elevator from its assembling position to its line-transferring position, releasing means controlling said spring actuated lifting device, release operating means adapted to be actuated by said feed controlling means and when actuated operating said releasing means after a time sufficient to allow the last matrices of the line to enter properly the assembling elevator, means controlled by said assembling elevator when returning into its assembling position and rendering said feed means operative after having been made inoperative by a line-separating symbol.

2. The combination with an automatic matrix-setting and line-casting machine, adapted to be operated by perforated bands containing line-filling symbols, feed means for feeding said perforated bands, line-filling means for automatically setting blank matrices, means for rendering said line-filling means operative controlled by said line-filling symbols, stop means for rendering said line-filling means inoperative, a slide carrying a line-resistant and adapted to be advanced corresponding to the length of a line of matrices which is being composed, and operatively connecting means between said slide and said stop means.

3. In combination with a matrix-setting and line-casting machine having an assembling elevator and adapted to be operated by perforated bands, containing word separating symbols, justifier controlling means adapted to be operated by said word-separating symbols and, when operated, causing a wedge-shaped justifier to be delivered into the assembling elevator, feed means for feeding said perforated bands, feed delaying means adapted to be actuated simultaneously with said justifier controlling means by said word separating symbols and when actuated delaying the feeding of said perforated band thereby allowing the wedge-shaped justifier to enter properly the assembling elevator.

4. In combination with a matrix-setting and line-casting machine having an assembling elevator and adapted to be operated by perforated bands containing word separating symbols and justification symbols, feed means for feeding said perforated bands, blank-controlling means causing when actuated a blank matrix to be delivered, and means controlled by said word separating symbols and adapted to actuate said blank controlling means, after a justification symbol has been operative.

5. In combination with a matrix-setting and line-casting machine having an assembling elevator and adapted to be operated by perforated bands, containing word-separating symbols and justification symbols, feed means for feeding said perforated bands, justifier controlling means adapted to be operated by said word separating symbols and when operated causing a wedge-shaped justifier to be delivered into the assembling elevator, blank delivery controlling means causing when operated a blank matrix to be delivered into the assembling elevator, blank delivery preparing means adapted to be operated by said justification symbols and when operated causing said blank delivery controlling means to be operated by said word-separating symbols simultaneously with said justifier controlling means during the composition of a line.

6. In combination with a matrix-setting and line-casting machine having an assembling elevator and adapted to be operated by perforated bands, containing word-separating symbols and justification symbols, feed means for feeding said perforated bands, justifier controlling means adapted to be operated by said word separating symbols and when operated causing a wedge-shaped justifier to be delivered into the assembling elevator, feed means for feeding said perforated band, feed delaying means adapted to be actuated simultaneously with said justifier controlling means by said word separating symbols and when actuated delaying the feeding of said perforated band thereby allowing the wedge-shaped justifier to enter properly the assembling elevator, blank delivery controlling means causing when operated a blank matrix to be delivered into the assembling elevator, blank delivery preparing means adapted to be operated by said justification symbols and when operated preparing said blank delivery controlling means to be operated by said word-separating symbols simultaneously with said justifier controlling means during the composition of a line.

7. In combination with a matrix-setting and line-casting machine having an assembling elevator and adapted to be operated by perforated bands, containing word separating symbols, feed means for feeding said perforated bands, a ratchet wheel, an escapement device acting on said ratchet wheel and when operated allowing a step-wise rotation of said ratchet wheel, driving means comprising differential gear for driving said ratchet wheel and said feed means alternatively, and means for operating said escapement device by means of said word-separating symbols thereby causing a stepwise rotation of said ratchet wheel and a corresponding stop of said feed means.

8. In combination with a matrix-setting and line-casting machine having an assembling elevator and adapted to be operated by perforated bands, containing word separating symbols, feed means for feeding said perforated bands, a ratchet wheel, an escapement device acting on said ratchet wheel and when operated allowing a step-wise rotation of said ratchet wheel, driving means comprising differential gear for driving said ratchet wheel and said feed means alternatively, a cam attached to said ratchet wheel, blank delivery controlling means adapted to be actuated by said cam and when actuated causing a blank matrix to be delivered into the assembling elevator, and means for operating said escapement device by said word-separating symbols thereby causing a stepwise rotation of said ratchet wheel, a corresponding stop of said feed means, and simultaneously the delivery of a blank matrix by means of said cam and said blank delivery controlling means.

9. In combination with a matrix-setting and line-casting machine having an assembling elevator and adapted to be operated by perforated bands, containing word separating symbols, justifier controlling means adapted to be operated by said word-separating symbols and, when operated, causing a wedge-shaped justifier to be delivered into the assembling elevator, feed means for feeding said perforated bands, a ratchet wheel, an escapement device acting on said ratchet wheel and when operated allowing a step-wise rotation of said ratchet wheel, driving means comprising differential gear for driving said ratchet wheel and said feed means alternatively, and means for operating said escapement device simultaneously with said justifier controlling means by said word-separating symbols thereby causing a step-wise rotation of said ratchet wheel and a corresponding stop of said feed means.

10. In combination with a matrix-setting and line-casting machine having an assembling elevator and adapted to be operated by perforated bands, containing line-filling symbols, feed means for feeding said perforated bands, feed controlling means adapted to render said feed means inoperative, line filling means adapted to be operated by the successive actuation of one of said line-filling symbols and said feed controlling means and when operated causing blank matrices to be delivered into the line, a spring-actuated lifting device for lifting said assembling elevator from its assembling position to its line-transferring position, locking means normally preventing the actuation of said spring-actuated lifting device, releasing means adapted to release said locking means when actuated, release controlling means comprising a cam adapted to actuate said releasing means, operatively connecting means between said release-controlling means and said feed controlling means, other operatively connecting means for operatively connecting said release controlling means to said releasing means and adapted to be disconnected by means of said line-filling symbol when being operative, line-controlling means comprising a line-resistant adapted to advance corresponding to the length of a line of matrices which is being composed and to stop the actuation of said line-filling means and further to re-set said releasing means and said release controlling means in operative connection thereby causing said assembling elevator to be lifted.

11. The combination of a matrix-setting and line-casting machine having an assembling elevator and adapted to be operated by perforated bands, containing line-separating symbols, feed means for feeding said bands, feed controlling means adapted to be operated by said line-separating symbols and when operated rendering said feed means inoperative, a lifting device for lifting said assembling elevator from its assembling position to its line-transferring position, lift controlling means for controlling the actuation of said lifting device and adapted to be controlled by said feed controlling means, and means controlled by said assembling elevator when returning into its assembling position and rendering said feed means operative after having been made inoperative by a line-separating symbol.

12. The combination of a matrix-setting and line-casting machine having an assembling elevator and adapted to be operated by perforated bands, containing line-separating symbols, feed means for feeding said bands, feed controlling means adapted to be operated by said line-separating symbols and when operated rendering said feed means inoperative, a lifting device for lifting said assembling elevator, lift controlling means adapted to be operated by said feed controlling means and when operated actuating said lifting device after a time sufficient to allow the last matrices of the line to enter properly the assembling elevator, means controlled by said assembling elevator when returning into its assembling position and rendering said feed means operative after having been made inoperative by a line-separating symbol.

13. The combination of a matrix-setting and line-casting machine having an assembling elevator and adapted to be operated by perforated bands containing line-separating symbols, feed means for feeding said bands, feed controlling means adapted to be operated by said line-separating symbols and when operated rendering said feed means inoperative, a lifting device for lifting said assembling elevator, operatively connecting means between said feed controlling means and said lifting device actuating when said feed controlling means have been operative said lifting device after a time sufficient to allow the last matrices of the line to enter properly the assembling elevator, means controlled by said assembling elevator when returning into its assembling position and rendering said feed means operative after having been made inoperative by a line-separating symbol.

14. In combination with a matrix-setting and line-casting machine adapted to be operated by perforated bands having an assembling elevator and matrix assembling means comprising matrix transferring belt, belt driving means for driving the latter, elevator lifting means for lifting said assembling elevator, lift controlling means for controlling said elevator lifting means, band feeding means for feeding said perforated bands, an electric circuit for operating the machine by means of said perforated band, circuit controlling means closing when rendered operative said electric circuit, and a common controlling member adapted to be brought into a rest position or different operative positions, causing in its rest position said transferring belt said band feeding means and said lift controlling means to be inoperative and said electric circuit to be opened, and rendering operative in its first operative position said transferring belt in its second operative position said band feeding means and said electric current controlling means and in its third operative position said lift controlling means.

In testimony whereof I have signed my name to this specification in the presence of two subscribing witnesses.

HEINRICH DREWELL.

Witnesses:
HENRY HASPER,
WOLDEMAR HAUPT.